July 3, 1934.  A. B. SMEDLEY ET AL  1,965,263
SUSPENSION UNIT FOR RISER CABLES
Filed July 15, 1932  2 Sheets-Sheet 1

Inventors
ANDERSON B. SMEDLEY
EDWARD F. W. SALISBURY
By Their Attorneys

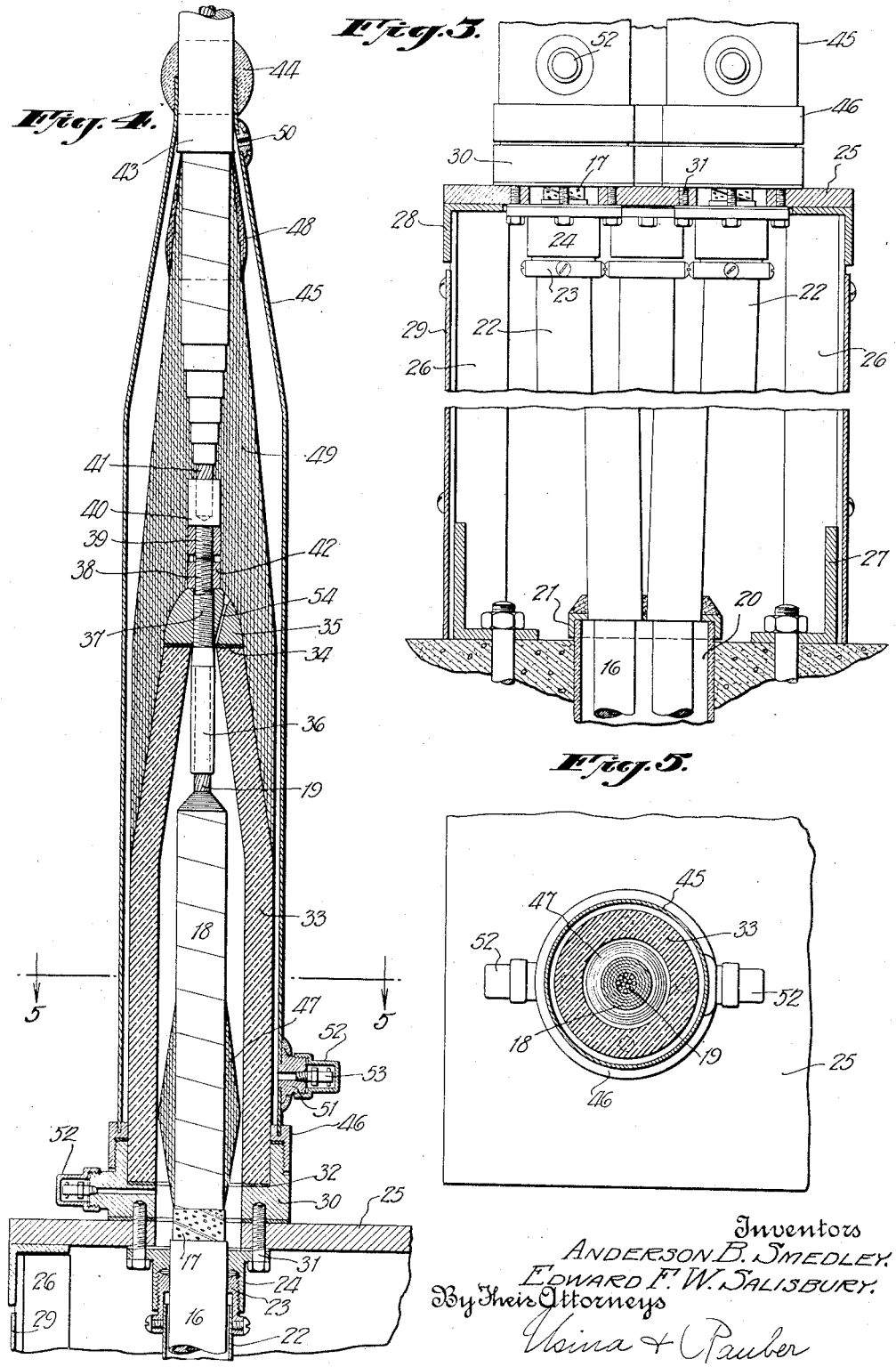

Patented July 3, 1934

1,965,263

UNITED STATES PATENT OFFICE 1,965,263

SUSPENSION UNIT FOR RISER CABLES

Anderson B. Smedley, Flushing, and Edward F. W. Salisbury, Yonkers, N. Y., assignors to Anaconda Wire & Cable Company, New York, N. Y., a corporation of Delaware Application July 15, 1932, Serial No. 622,618

9 Claims. (Cl. 247—8)

Our invention aims to provide compact and economical means for supporting electric cables such, for example, as a vertical riser of a mine shaft cable, risers in tall buildings, power houses, sub-stations and the like. It is applicable to either high or low voltage cables and to single or multiple conductor cables.

Heretofore cables have been supported in vertical position by gripping the sheath at spaced heights or by other supporting means applied exterior to the sheath or insulation. This method of supporting the cables suffers from a number of disadvantages, among which are the tendency for the conductor, the weight of which comprises the principal part of the weight of the cable, slipping in the insulation or working loose and slipping from position owing to the contraction and expansion brought about by temperature changes.

Another object of the invention is to provide means whereby the conductor itself may be directly supported at appropriate heights.

A further object of the invention is to provide a stop joint between two conductor lengths which will seal the lengths against migration of insulating compound or fluid from one cable length to the other.

The accompanying drawings illustrate an embodiment of the invention.

Fig. 3 is a sectional view of a supporting frame for one of the mounting plates.

Fig. 4 is a central vertical section with certain interior parts in elevation.

Fig. 5 is a cross-section of the same on the line 5—5 of Fig. 4.

In our invention consecutive lengths of cable, either as single conductor cables or in groups of two or more cables, are suspended by means of a connector of ample tensile strength which is, in turn, supported on an insulator and is connected to the lower end of the length of conductor immediately above it. In this way each length of conductor is directly and individually supported while forming a part of a continuous conductor. The invention may be used on high or low voltage cables. On higher voltage cables the insulator on which the cable is supported may form a part of the insulated splice between the vertical riser cable and any cables that may be taken off from that riser to supply equipment. The insulator may, for this purpose, be enclosed in a copper splice sleeve which encloses the entire splice onto the cables and which sleeve is filled with insulating compound.

Figure 1:
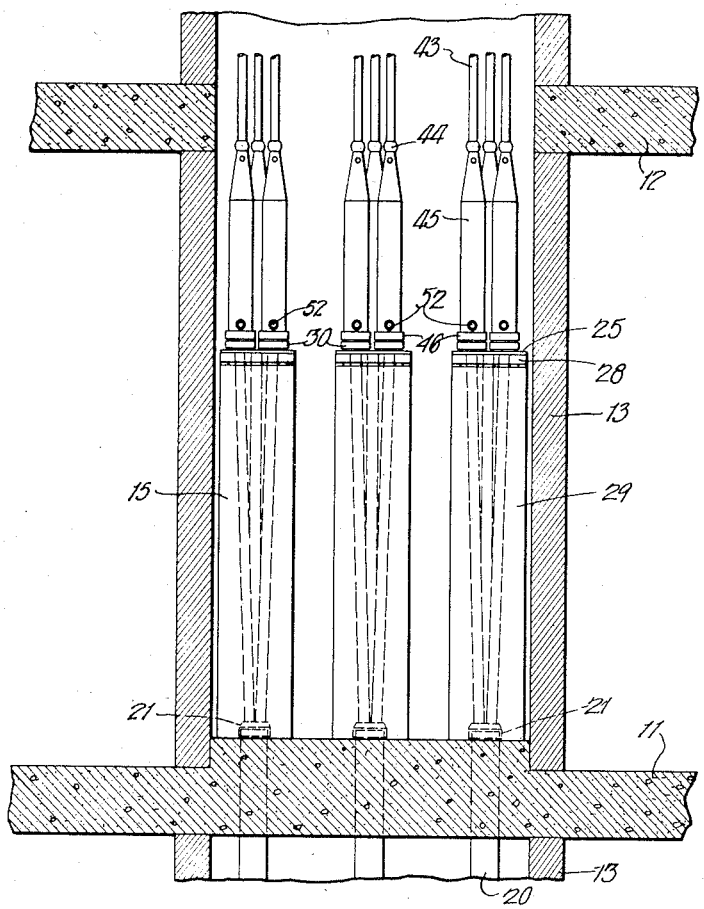
Fig. 1 is a vertical elevation, and Fig. 2 a plan of a group of cable suspensions in the splicing chamber of a building.
Figure 2:
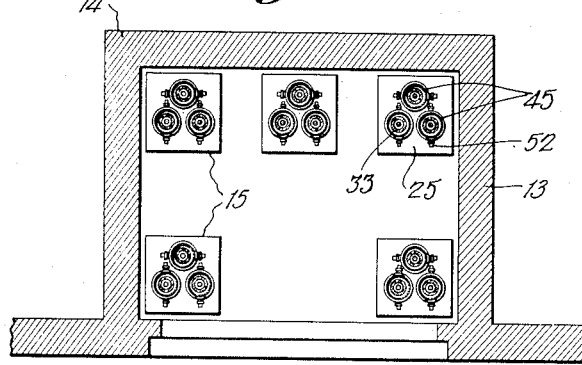

In Fig. 1 there are shown two concrete floors of a high building, 11 and 12, and a chamber or shaft surrounded by vertical walls 13, 14 through which the risers in the building pass. Within this chamber and mounted on the floor 11 are the frames 15 for five groups of three conductors each.

Each cable (Fig. 4) comprises a sheath 16 within which is a spirally wrapped perforated metal tape 17 closely fitted around the impregnated paper or cloth or other insulating tape 18 which immediately surrounds the copper conductor 19.

Three such cables come up through the floor in a conduit 20 (Fig. 3). At the exit from this conduit the three cables pass through a cap 21 and diverge upward through tubes 22 which are supported at their upper ends by a ring on the stuffing nuts 23, Fig. 4, screwed into bushings 24 which are fastened to the under side of a mounting plate 25 forming the top of the frame 15, previously referred to.

This frame comprises upright corner angles 26 which are fastened to the floor 11 by means of base angles 27 and which carry at their upper ends top angles 28 on which the plate 25 is directly supported. A steel plate 29 surrounds the frame and is fastened to the vertical angles 26. Above the mounting plate 25 is carried the means for suspending the weight of the cables. A base 30 of non-magnetic metal is mounted on the plate 25. The stuffing box 24, plate 25 and base 30 are fastened together with tight gaskets between them by means of bolts 31. On the inner portion of the base 30 is a gasket 32 on which rests an insulator 33 of bakelite or other suitable material; on top of which, in turn, is a gasket 34 and a hood 35 of cast bronze or other electrical conducting material.

The end of the conductor 19 has applied to it a seamless connector 36 of copper which is secured to the end of the conductor and which has an upward extension 37 which is threaded preferably with a self-locking thread of the Dardelet or other suitable type. The hood 35 is screwed and locked onto the extension 37 of the connector.

The connector has a further, smaller extension 38 which is screwthreaded and abuts against the end of a similarly threaded extension 39 of a copper stem 40 which is fixed on the end of the conductor 41 of a cable extending upward from this suspension unit.

The two extensions 38 and 39 are threaded in opposite directions and are engaged in opposite ends of a turn buckle 42 by which they are drawn closely together and are connected electrically. The upper cable may be of any suitable type for distributing the current.

To the shell 43 of the upper cable there is fastened by a wiped joint 44 the close fitting end of a copper sleeve 45 which is shaped to enclose the connections above described and the insulating materials and which sleeve is fixed at its lower end to a nut 46 screwed down onto the base 30 which has a suitable packing between.

At the lower end of the unit, where the varnished cambric or silk or other insulating tape 18 is exposed, a stress cone is provided for better distribution of the electric stresses. This cone 47 consists of varnished cambric tape applied spirally in layers so as to gradually increase the thickness as it extends upward from the lower end to a maximum and then reduce its thickness to a vanishing point; with metal foil applied outside from the low point to the point of maximum diameter, this metal foil being soldered to the metal foil 17.

The purpose of this is to secure a gradual flaring out of the metal foil instead of an abrupt termination thereof. This in itself is an old expedient for this purpose in electric cable joints and the like and is not illustrated in detail.

Above the insulator 33 the insulation on the conductor is stepped down, as shown. A stress cone 48 is applied at this end similar to the cone 47 at the lower end and with a metal cone wrapping extending from the upper end to the point of maximum diameter. Before this stress cone is applied, however, a wrapping of varnished cambric or other insulating tape 49 is applied beginning at the termination of the shell 43 of the upper conductor and extending continuously downward over the upper conductor, the stem 40, turn buckle, hood 45 and the upper tapered portion of the insulator 33. This consists of a number of layers each wrapped spirally with butt joints and laid up, as are all the other wrappings described, in insulating oil or compound.

In the upper end of the copper sleeve 45 there is an opening to which is applied a threaded nipple 50 welded to the sleeve. The opening is used for introducing oil, or any insulating material, after which a plug is screwed therein and closed to make it tight.

Near the lower end of the sleeve is a second nipple 51 also welded in place and carrying a metal cap 52 which covers a plug 53 threaded into the nipple. By means of these two openings the sleeve can be filled with a joint insulating compound introduced in the usual way. If an oil or insulating compound be used which runs away into the cable, the sleeve may be refilled from time to time, or connected to a reservoir.

The hood 35 also has an opening 54 through it. The opening in the upper end of the insulator 33 through which the connector 36 passes is larger than the connector so as to leave an annular space through which entrapped air or oil or compound can pass in order to fill the space within the insulator 33. This is used to fill the space in question and is plugged and soldered before application of the wrapping 49. The insulated suspension unit consisting of the tube 33 and connections at the upper end may be used separately, that is, without the enclosed cable splice which is shown herein.

What we claim is:

1. A vertical electric cable suspension unit comprising a mounting plate, a hollow insulator mounted on said plate, a pair of upwardly aligned insulated sheathed cables the lower of which extends upwardly into and terminates within said hollow insulator and the upper of which extends downwardly and terminates above said insulator, a connector mounted on said insulator and secured to the conductor of said cables, the insulation of the upper cable being stepped down above the insulator, a wrapping of non-conducting material extending over and between the upper end of the insulator and the stepped down insulation, and an insulating fluid container enclosing said insulator and wrapping and sealed to the sheaths of said cables.

2. A vertical electric cable suspension unit comprising a mounting plate, a hollow insulator mounted on said plate, a pair of upwardly aligned insulated sheathed cables the lower of which extends upwardly into and terminates within said hollow insulator and the upper of which extends downwardly and terminates above said insulator, a connector mounted on said insulator and secured to the conductor of said cables, the insulation of the upper cable being stepped down above the insulator, a wrapping of non-conducting material extending over and between the upper end of the insulator and the stepped down insulation, an insulating fluid container enclosing said insulator and wrapping and sealed to the sheaths of said cables, and a stress cone within said container adjacent to the end of the sheath of said upper cable.

3. A vertical electric cable suspension unit comprising a mounting plate, a hollow insulator mounted on said plate, a pair of upwardly aligned insulated sheathed cables the lower of which extends upwardly into and terminates within said hollow insulator and the upper of which extends downwardly and terminates above said insulator, a connector mounted on said insulator and secured to the conductor of said cables, the insulation of the upper cable being stepped down above the insulator, a wrapping of non-conducting material extending over and between the upper end of the insulator and the stepped down insulation, an insulating fluid container enclosing said insulator and wrapping and sealed to the sheaths of said cables, and stress cones at the ends of the sheaths of said cables.

4. A vertical electric cable suspension unit comprising a mounting plate, a hollow insulator mounted on said plate, a pair of upwardly aligned insulated sheathed cables the lower of which extends upwardly into and terminates within said hollow insulator and the upper of which extends downwardly and terminates above said insulator, a connector having a dome mounted on said insulator and secured to the conductor of said cables, the insulation of the upper cable being stepped down above the insulator, a wrapping of non-conducting material extending over and between the upper end of the insulator and the stepped down insulation, and an insulating fluid container enclosing said insulator and wrapping and sealed to the sheaths of said cables.

5. A vertical electric cable suspension unit comprising a mounting plate, a hollow insulator mounted on said plate, a pair of upwardly aligned insulated sheathed cables the lower of which extends upwardly into and terminates within said hollow insulator and the upper of which extends downwardly and terminates above said insulator, a connector mounted on said insulator and secured to the conductor of said cables, the insulation of the upper cable being stepped down above the insulator, a wrapping of non-conducting material extending over and between the upper end of the insulator and the stepped down insulation, an insulating fluid container enclosing said insulator and wrapping and sealed to the sheaths of said cables, said insulator being spaced from said cable and tapered toward its upper end.

6. A vertical electric cable suspension unit comprising a mounting plate, a hollow insulator mounted on said plate, a pair of upwardly aligned insulated sheathed cables the lower of which extends upwardly into and terminates within said hollow insulator and the upper of which extends downwardly and terminates above said insulator, a connector having a dome mounted on said insulator and secured to the conductor of said cables, the insulation of the upper cable being stepped down above the insulator, a wrapping of non-conducting material extending over and between the upper end of the insulator and the stepped down insulation, an insulating fluid container enclosing said insulator and wrapping and sealed to the sheaths of said cables, said dome being vented, and means for supplying said insulator and said container near their bases with insulating fluid.

7. A vertical electric cable suspension unit comprising a mounting plate, a hollow insulator mounted on said plate, a pair of upwardly aligned insulated sheathed cables the lower of which extends upwardly into and terminates within said hollow insulator and the upper of which extends downwardly and terminates above said insulator, a connector mounted on said insulator and secured to the conductor of said cables, the insulation of the upper cable being stepped down above the insulator, a wrapping of non-conducting material extending over and between the upper end of the insulator and the stepped down insulation, and an insulating fluid container enclosing said insulator and wrapping, the sheath of the upper cable being sealed to the container and the sheath of the lower cable being sealed to the mounting plate by a stuffing box, and said container being sealed on said mounting plate.

8. A vertical electric cable suspension unit comprising a mounting plate, a cable extending upwardly through said mounting plate, a hollow insulator mounted on said mounting plate, an electric conductor above said insulator connected to said cable, an insulating fluid container mounted on said plate and enclosing the ends of said cable and conductor, and a stuffing box sealed to said plate and to the sheath of said cable.

9. A vertical electric cable suspension unit comprising a mounting plate, a cable extending upwardly through said mounting plate, a hollow insulator mounted on said mounting plate, an electric conductor above said insulator connected to said cable, an insulating fluid container mounted on said plate and enclosing the ends of said cable and conductor, a stuffing box sealed to said plate and to the sheath of said cable, and a metallic tube supported at its upper end from said stuffing box and encircling said cable.

ANDERSON B. SMEDLEY.
EDWARD F. W. SALISBURY.